United States Patent
Sharma et al.

(10) Patent No.: US 10,257,842 B2
(45) Date of Patent: Apr. 9, 2019

(54) METHOD AND APPARATUS FOR PROVIDING ZONE BASED COOOPERATION TO USER EQUIPMENT (UE) IN A WIRELESS COMMUNICATION NETWORK

(71) Applicants: Diwakar Sharma, Bangalore (IN); Karthik Rangaraj Manavalan, Bangalore (IN)

(72) Inventors: Diwakar Sharma, Bangalore (IN); Karthik Rangaraj Manavalan, Bangalore (IN)

(73) Assignee: Samsung Electronics Co., Ltd (KR)

( * ) Notice: Subject to any disclaimer, the term of this patent is extended or adjusted under 35 U.S.C. 154(b) by 185 days.

(21) Appl. No.: 15/071,842

(22) Filed: Mar. 16, 2016

(65) Prior Publication Data
US 2017/0055273 A1  Feb. 23, 2017

(30) Foreign Application Priority Data

Aug. 18, 2015 (IN) .......................... 4319/CHE/2015

(51) Int. Cl.
*H04W 72/08* (2009.01)
*H04W 4/021* (2018.01)
*H04L 5/00* (2006.01)

(52) U.S. Cl.
CPC .......... *H04W 72/085* (2013.01); *H04L 5/006* (2013.01); *H04L 5/0035* (2013.01); *H04W 4/021* (2013.01)

(58) Field of Classification Search
CPC .......... H04W 74/0833; H04W 72/042; H04W 72/04; H04W 72/0413; H04W 72/005; H04W 76/023; H04W 88/02; H04W 52/226; H04W 72/0406; H04W 72/048; H04W 72/12; H04W 76/046; H04W 88/08; H04W 24/08; H04W 52/242; H04W 52/245; H04W 72/1278; H04W 28/0236; H04W 4/021; H04W 72/085; H04W 74/002; H04W 74/08; H04L 5/0053; H04L 5/0073; H04L 5/0078; H04L 43/16; H04L 5/0035; H04L 5/006; H04B 7/024; H04B 17/318
See application file for complete search history.

(56) References Cited

U.S. PATENT DOCUMENTS

| | | | | |
|---|---|---|---|---|
| 2003/0087604 A1* | 5/2003 | Stein | ..................... | G01S 5/0205 455/65 |
| 2015/0346318 A1* | 12/2015 | Militano | ............... | H04W 24/02 455/456.5 |
| 2016/0037550 A1* | 2/2016 | Barabell | ............... | H04B 17/318 455/450 |

* cited by examiner

*Primary Examiner* — Yemane Mesfin
*Assistant Examiner* — Mon Cheri S Davenport
(74) *Attorney, Agent, or Firm* — The Farrell Law Firm, P.C.

(57) ABSTRACT

A method and an apparatus for providing zone based prediction. The method includes determining, by a base station, a plurality of zones by dividing a coverage area of a cell, receiving, by the base station, channel state information (CSI) from a user equipment (UE), identifying, by the base station, a first zone from the plurality of zones where the UE encounters an obstructed area based on the CSI at a time domain, and allocating, by the base station, at least one resource to the UE to compensate for signal losses if the UE enters the obstructed area.

16 Claims, 11 Drawing Sheets

METHOD AND APPARATUS FOR PROVIDING ZONE BASED COOOPERATION TO USER EQUIPMENT (UE) IN A WIRELESS COMMUNICATION NETWORK

PRIORITY

This application claims priority under 35 U.S.C. § 119(a) to an Indian CS Patent Application filed in the Indian Property Office on Aug. 18, 2015 and assigned Serial No. 4319/CHE/2015, the entire disclosure of which is incorporated herein by reference.

BACKGROUND

1. Field of the Disclosure

The present disclosure relates generally to wireless communication, and more particularly, to a method and apparatus for zone based cooperation to a user equipment (UE) in a wireless network.

2. Description of the Related Art

In the current wireless technologies, including third generation (3G) and fourth generation (4G) technologies, the communication between a base station or eNodeB (eNB) and a user equipment happens over a microwave cellular system, wherein a network coverage area or zone of the base station is of a microwave cellular system. Signals transmitted and received within a coverage zone of a base station are of a microwave frequency, ranging from 1 GHz to 6 GHz. A UE can use the part of a radio spectrum of the frequency for wireless communication.

It can be observed that the base stations can be in close proximity to each other to cover a larger geographical area to provide better network coverage so that a user can take advantage of a seamless wireless network for various wireless applications, including but is not limited to, mobile originated (MO)/mobile terminating (MT) calling, messaging, data packet accessing and the like. As two or more base stations are in close proximity, the network coverage zone of the two or more base stations can overlap at the edge of the network zones and can form a network overlapping zone. The same overlapping of coverage zone can be observed between two or more cells of a base station.

FIG. 1 is a schematic of a network architecture 100 illustrating overlapping of coverage regions of two base stations.

Referring to FIG. 1, in the network architecture 100, a first base station 102 and a second base station 104 have coverage regions of a particular zone and it can be observed that the coverage regions of the base stations overlap at the edge to form an overlapping zone. As the overlapping zone includes frequencies of both the first base station 102 and the second base station 104, the UE can experience better network accessibility. However, in actuality, the overlapping zone provides a lower quality of network accessibility due to increased signal to interference plus noise ratio (SINR). The SINR in the overlapping zone is directly proportional to, and therefore increases, the error probability of packet detection, and thereby degrades the quality of service (QoS). In practical and real world situations, as more and more base stations are in close proximity, the situation worsens as the overlapping zones increase between two or more base stations.

To minimize the problems caused by overlapping zones in a coverage region, signals can be exchanged between the base stations to reduce the frequency at the edges of the coverage regions where an overlapping zone is formed. A millimeter wave (MMwave) cellular system is another solution to address the problems caused by overlapping zones in cellular regions. An MMwave cellular system is an emerging technology that is being implemented and used in fifth generation (5G) technology. An MMwave cellular system addresses the problems posed by a microwave cellular system, and attempts to provide uniform, minimal interference network coverage to a UE. An MMwave system forms a plurality of spectral beams of shorter wavelength than a microwave cellular system to cover an entire region of a base station. As the wavelength becomes shorter, and the distance between two antennas in a base station is inversely proportional to the wavelength, the number of antennas that can be placed in the coverage region of the base station can increase to provide a higher quality frequency signal to each UE, and thereby reduce the problems caused by overlapping zones.

However, an MMwave cellular system also has drawbacks. In an MMwave cellular system, objects ranging from a small size to large buildings, walls, and polls act as obstructions to a transmitted signal within a beam. These obstructions can create noise, block the signal, and deteriorate the quality of the signal.

FIG. 2 is a schematic of a network architecture 200 illustrating obstructions in beams of the millimeter waves of base stations.

Referring to FIG. 2, the network 200 includes a first base station 202, and a second base station 204 transmitting millimeter waves. The millimeter waves are overlapping at the edges of the beams and thereby forming overlapping zone. The beams from both the base station A 202 and the base station B 204 are being obstructed by plurality of obstructions, wherein due to high absorption in MMwave, NLOS paths remains weak in MMwave communication and thereby creating noise and blocking the transmission line of sight (LOS) path, resulting in high penetration losses during data transfer.

FIG. 3 is a schematic diagram of a network architecture 300 illustrating blocking zones due to obstructions in a millimeter wave base station, according to an embodiment of the present disclosure.

Referring to FIG. 3, a user equipment (UE) 306 is illustrated moving in a network coverage area/zone of millimeter wave networks and how obstructions create obstacles to the UE 306 for accessing a network. The network architecture 300 includes a first base station 302, a second base station 304, and the UE 306, wherein the first base station 302 and the second base station 304 are each based on a millimeter wave system that generates millimeter wave beams. According to FIG. 3, the UE 306 accesses the network while moving within the coverage zones of both the first base station 302 and the second base station 304 over a period of time. At time 0, the UE 306 starts moving within the coverage zone of the first base station 302. At time t, it can be observed that the UE 306 is in a non-blockage zone of the first base station 302 and, thus, is able to access resources allocated with a very low SINR. As the UE 306 moves in the coverage zone, the UE 306 encounters an obstruction at time t+T. As the UE 306 still has bandwidth available for accessing the network, it can be observed that data transfer remains adequate for a certain period of time. At t+T2, the UE 306 continues being affected by the obstruction, and thus without any recovery, the UE 306 loses network access, which can be seen as a sudden dip in the SINR mentioned above for the network architecture 300. It is to be understood that, for any given zone, coarse level channel state information (CSI) is known at a base station.

Further, as the UE 306 enters the overlapping zone of the first base station 302 and the second base station 304, the second base station 304 provides a better network coverage area without any obstruction. Therefore, the UE 306 enters the coverage area of the second base station 304. Thus, the UE 306 can access the network. However, after a certain time period, the UE 306 encounters another obstruction in the coverage region of the second base station 304. Thus, another sudden dip in SINR can be observed in the timing graph of the UE 306. Thus, it can be observed that the UE 306 encounters serious difficulty in accessing the network because of the obstructions.

In view of the foregoing, it is understood that, existing millimeter wave systems are prone to obstructions and the quality of service may degrade as the number of obstacles in a beam of a base station increases. There is no process or system that can identify and inform the quality of a beam before a UE starts using the spectrum of the beam. Further, there is no system or method that can provide a better spectrum to a UE upon creating zones within one or more beams, identifying in which zone the UE is present, and providing better quality of the spectrum to the UE.

Accordingly there is a need in the art to provide a method and system for providing zone based cooperation to a UE in a wireless network.

The above information is presented as background information only to help the reader to understand the present disclosure. Applicants have made no determination and make no assertion as to whether any of the above might be applicable as related art with regard to the present application.

SUMMARY

An aspect of the present disclosure is to provide a method and system for zone based cooperation to a UE in a wireless network.

According to an aspect of the present disclosure, a method for providing zone based prediction in a wireless communication system, the method comprising: determining, by a base station, a plurality of zones by dividing a coverage area of a cell; receiving, by the base station, channel state information (CSI) from a user equipment (UE); identifying, by the base station, a first zone from the plurality of zones where the UE encounters an obstructed area based on the CSI at a time domain; and allocating, by the base station, at least one resource to the UE to compensate for signal losses if the UE enters the obstructed area.

According to another aspect of the present disclosure, a base station for providing zone based prediction in a wireless communication, wherein the base station comprising: a transceiver configured to receive channel state information (CSI) from the UE; and a controller configured to: determine a plurality of zones by dividing a coverage area of a cell, identify a first zone from the plurality of zones where the UE encounters an obstructed area based on the CSI at a time domain, and allocate at least one resource to the UE to compensate for signal losses if the UE enters the obstructed area.

According to another aspect of the present disclosure, a method for providing zone based prediction in a wireless communication system is provided. The method includes transmitting, by a UE, CSI to a base station for determining a plurality of zones by dividing a coverage area of a cell and identify a first zone from the plurality of zones where the UE encounters an obstructed area based on the CSI at a time domain; and receiving, from the base station, information related to at least one resource to compensate for signal losses if the UE enters the obstructed area.

According to another aspect of the present disclosure, a user equipment (UE) for providing zone based prediction in a wireless communication system, the UE comprising: a transceiver configured to transmit channel state information (CSI); and receive information related to at least one resource to compensate for signal losses if the UE enters the obstructed area, where a plurality of zones is determined by dividing a coverage area of a cell and identify a first zone from the plurality of zones where the UE encounters an obstructed area based on the CSI at a time domain; and a controller configured to control the transceiver.

According to another aspect of the present disclosure, a chipset for providing zone based prediction in a wireless communication system is provided. The chipset is configured to transmit, by a user equipment (UE), channel state information (CSI) to a base station for determining a plurality of zones by dividing a coverage area of a cell and identify a first zone from the plurality of zones where the UE encounters an obstructed area based on the CSI at a time domain; and receive, from the base station, an allocation of at least one resource to compensate for signal losses if the UE enters the obstructed area.

Another aspect of the present disclosure provides channel state information that includes, but is not limited to, at least one of a channel quality indicator (CQI), a pre-coding matrix indicator (PMI), a rank indicator (RI), and a zone number.

Another aspect of the present disclosure identifies the first zone by providing, by the UE, zone identification parameters to the base station, where the zone identification parameters include a at least one of positioning reference signal (PRS) and a geographical location of the UE based on observed time difference of arrival (OTDOA) positioning.

Another aspect of the present disclosure transmits, by the UE, information on a Doppler shift, a moving direction and instantaneous CSI to the base station.

Another aspect of the present disclosure identifies, by the base station, a first zone where the UE encounters a blockage area by measuring a CSI parameter distribution for the first zone, performing time averaging across a preset number of previous sub frames, and deriving a CQI distribution over the preset number of previous sub frames to identify dips in the CSI information.

Another aspect of the present disclosure is that the signal is said to be blocked if there is no line of sight (LOS) path and the signal to interference noise ratio (SINR) is below a preset threshold.

Another aspect of the present disclosure allocates one or more network resources to the UE by allocating, by a single base station, a plurality of network resources to the UE to continue service in the blockage area, and allocating, by a plurality of base stations, a plurality of network resources to the UE to continue service in the blockage area.

Another aspect of the present disclosure allocates one or more network resources to the UE by awaiting, by the base station, the time when the UE is in the blockage area, and allocating one or more network resources to the UE based on a coordinated multipoint (CoMP) technique.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and other aspects, features and advantages of the present disclosure will be more apparent from the following description, taken in conjunction with the accompanying drawings, in which.

Figure 1:
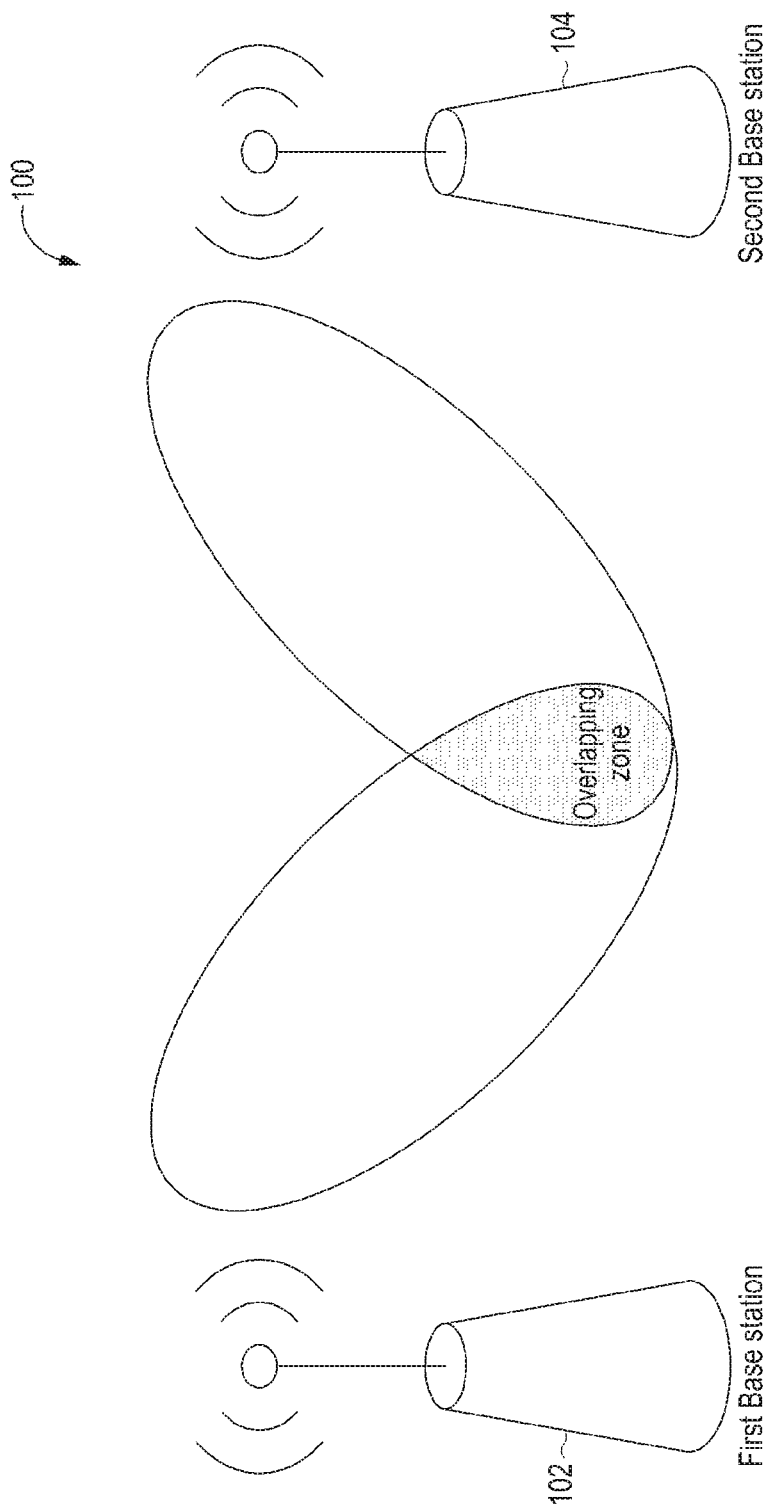
FIG. 1 is a schematic of a network architecture illustrating overlapping of coverage regions of two base stations.
Figure 2:
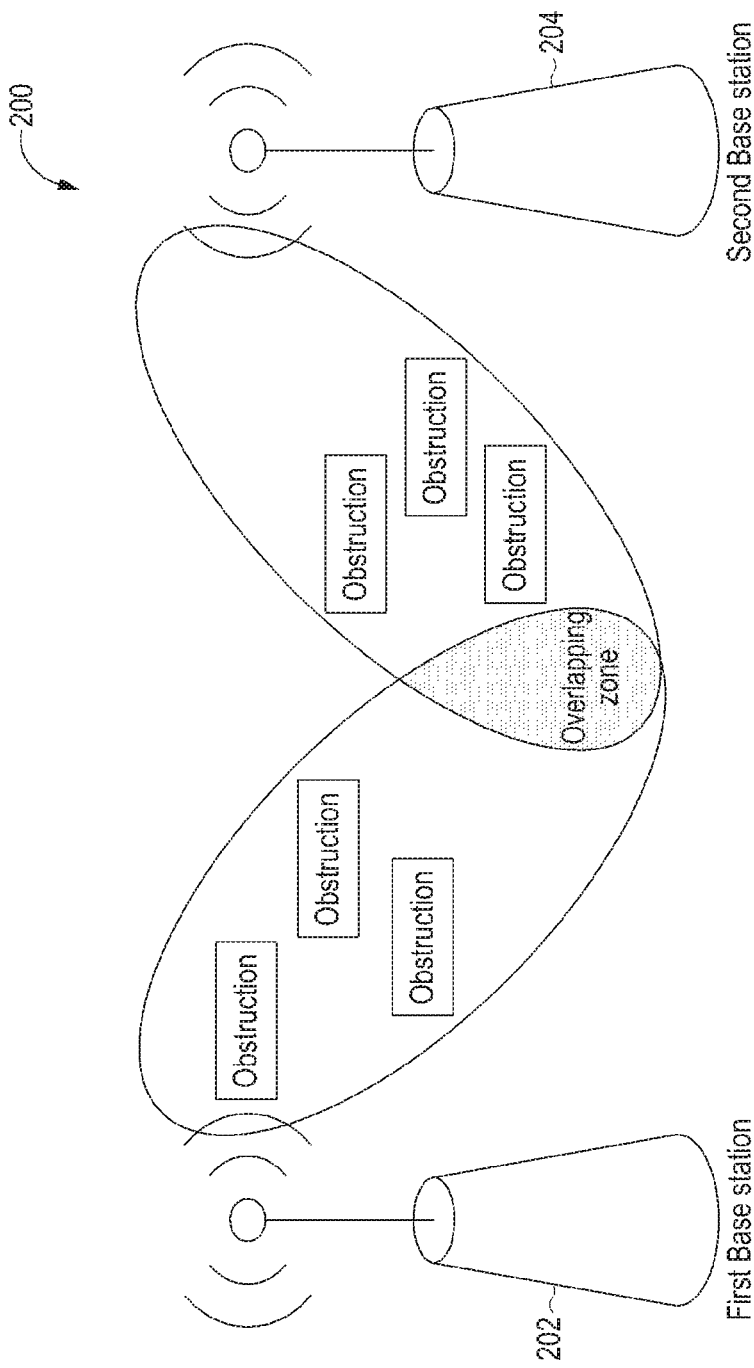
FIG. 2 is a schematic of a network architecture illustrating obstructions in beams of millimeter waves of base stations.
Figure 3:
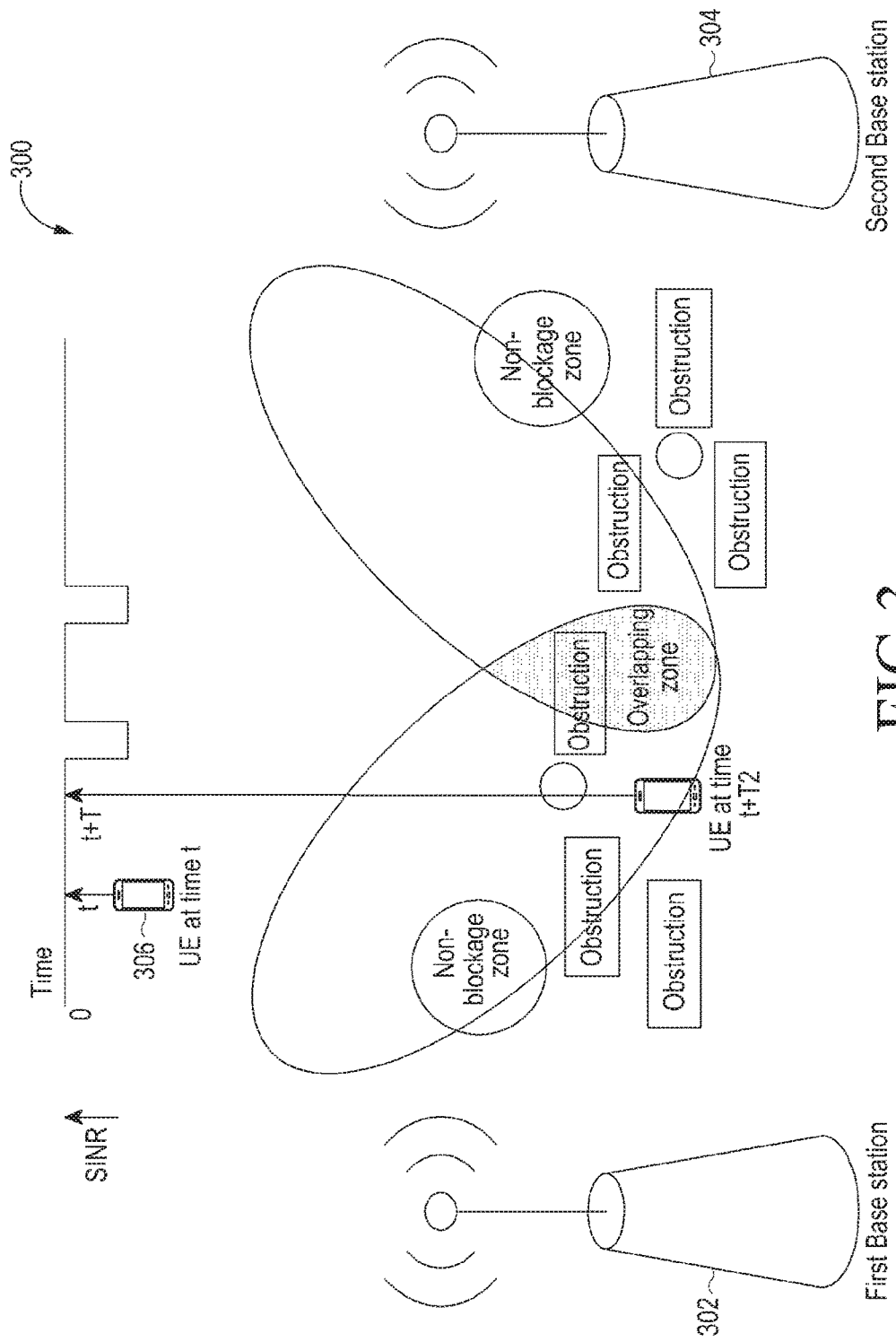
FIG. 3 is a schematic diagram of a network architecture illustrating blocking zones due to obstructions in a millimeter wave base station.

Although specific features of the present invention are shown in some drawings and not in others. This is done for convenience only as each feature may be combined with any or all of the other features in accordance with the present invention.

DETAILED DESCRIPTION OF THE EMBODIMENTS OF THE PRESENT DISCLOSURE

The present disclosure provides a method and system for zone based cooperation to a user equipment (UE) in a wireless network. In the following detailed description of the embodiments of the present disclosure, reference is made to the accompanying drawings that form a part hereof, and in which are shown by way of illustration certain embodiments in which the present disclosure may be practiced. These embodiments are described in sufficient detail to enable those skilled in the art to practice the embodiments of present disclosure, and it is to be understood that other embodiments may be utilized and that changes may be made without departing from the scope and spirit of the present disclosure. The following detailed description is, therefore, not to be taken in a limiting sense, and the scope of the present disclosure is defined only by the appended claims and their equivalents.

The present disclosure may refer to "an," "one," or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a," "an," and "the" are intended to include the plural forms as well, unless expressly stated otherwise. It will be further understood that the terms "includes," "comprises," "including," and/or "comprising" when used in the present disclosure, indicate the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which the present disclosure pertains. It will be further understood that terms, such as those defined in commonly used dictionaries, should be interpreted as having meanings that are consistent with their meanings in the context of the relevant art and will not be interpreted in an idealized or overly formal sense unless expressly so defined herein.

With an aspect of predicting obstructions or blockages in zones of millimeter wave beams of a base station and achieving optimum throughput and resource utilization by various alternatives, the present disclosure describes zone based cooperation to a UE in a wireless network.

The various embodiments herein disclose a method for zone based cooperation to a UE in a wireless network. According to an embodiment of the present disclosure, the method includes a step for creating, by a base station, a plurality of zones by dividing a coverage area of a cell. The base station can be a millimeter wave based base station, which identifies a coverage area within a cell. Based on the coverage region, the base station creates a plurality of zones within the coverage region of the cell, wherein each zone acts as a minimum unit of the serving beam. A detailed description of creating zones within the coverage region of the cell is described below with respect to FIG. 4, and is thus not described here to avoid repetition.

Further, the method includes receiving channel state information (CSI) transmitted from a UE. The base station receives CSI from the UE to understand the current channel quality accessed by the UE and to estimate an actual location of the UE to improve the channel quality to be provided. In an embodiment of the present disclosure, a base station can receive the CSI from the UE during conditions such as, but is not limited to, periodic intervals, only when the UE experiences degradation in the quality of resources that is being provided, when the entire bandwidth is being lost and thus connection with the base station is lost, and the like.

In an embodiment of the present disclosure, the channel state information can be information that includes, but is not limited to, a channel quality indicator (CQI), a pre-coding matrix indicator-elevation (PMI) (rank-elevation), a PMI-azimuthal (rank-azimuthal) for three dimensional (3D) beam forming, a rank indicator (RI), a zone number, and the like. In another embodiment of the present disclosure, the UE can also transmit information on a Doppler shift, moving direction and instantaneous CSI to the base station along with the CSI.

Further, the method includes identifying a first zone where the UE encounters a blockage area based on the CSI at a time domain. The base station identifies a current zone in which the UE is currently present based on the CSI received from the UE, and based on the received CSI, the base station also identifies the direction in which the UE is moving, and thereby identifies the forthcoming zone. The UE can provide zone identification parameters to the base station, where the zone identification parameters include a positioning reference signal (PRS) and a geographical location of the UE based on observed time difference of arrival (OTDOA) positioning.

Based on the received parameters from the UE, the base station identifies a first zone in which the UE can encounter a blockage area that would block the use of resources. To identify the first zone with the blockage region, the base station initially receives the parameters from the UE as mentioned above and measures a CSI parameter distribution for the first zone. In an embodiment of the present disclosure, the CSI can be measured by the UE and can be provided to the base station. In an embodiment of the present disclosure, the CSI can be measured by any other network device present between communication of the base station and the UE and can provide the measured CSI to the base station. A person having ordinarily skill in the art can understand that the measuring of the CSI can be done by any of the known network devices without departing from the scope and spirit of the present disclosure. It is to be understood that for any given zone, coarse level CSI is known at the base station.

After the CSI parameter distribution is measured, the base station can perform time averaging across a preset number of previous sub frames. Upon identifying the time average, the base station can derive a CQI distribution over the preset number of sub frames to identify dips in the CSI, and thereby identify the first zone in which the UE can encounter a blockage area. The process of identifying a zone where the UE can encounter a blockage area is described below in detail with respect to FIGS. 4 and 5, and thus is not described here in detail to avoid repetition.

Further, according to the present disclosure, the method includes allocating one or more network resources to the UE to handle signal losses in a blockage area. By virtue of zone creation and feedback from the UE, the network can identify that the UE might enter a zone in which a blockage area exists that would block access to network resources, the base station can allocate one or more network resources to the UE, such that any kind of signal loss that can lead to poor quality of service can be avoided. When the UE passes through a blockage region and the UE can take advantage of obstacle/jitter free network access even in the blockage area of the forthcoming zone, the base station can identify how to provide the network resources to the UE efficiently.

In an embodiment of the present disclosure, a single base station can allocate a plurality of network resources to a UE to continue service in a blockage area. The base station can allocate more network resources to the UE than the network resources allocated earlier, wherein the UE can use more network resources in a blockage area and thereby any loss that might otherwise occur due to a blockage can be compensated for by allocating additional network resources by the single base station.

In another embodiment of the present disclosure, a plurality of base stations can allocate a plurality of network resources to a UE to continue service in a blockage area. The base station can communicate with one or more neighboring base stations having zones overlapping with each other and can seek help of the neighboring base station to provide additional network resources needed by the UE for obstacle free network access. A person having ordinary skill in the art can understand that any known method for selecting a neighboring base station for providing network resources to the UE can be used in the present method, without departing from the scope and spirit of the present disclosure.

In an embodiment of the present disclosure, a single base station can allocate a plurality of network resources to a UE to continue service in a blockage area. When the additional network resources provided by the single base station are not sufficient, then the single base station can communicate with one or more neighboring base stations to provide additional resources jointly to the UE to continue service in the blockage area.

During allocation of network resources to the UE, the base station waits for a time domain when the UE is in a blockage area, and based on a prediction time and also a time required to cooperate between multiple base stations for joint allocation using a coordinated multipoint (CoMP) technique, the base station can allocate one or more network resources to the UE.

Figure 4:
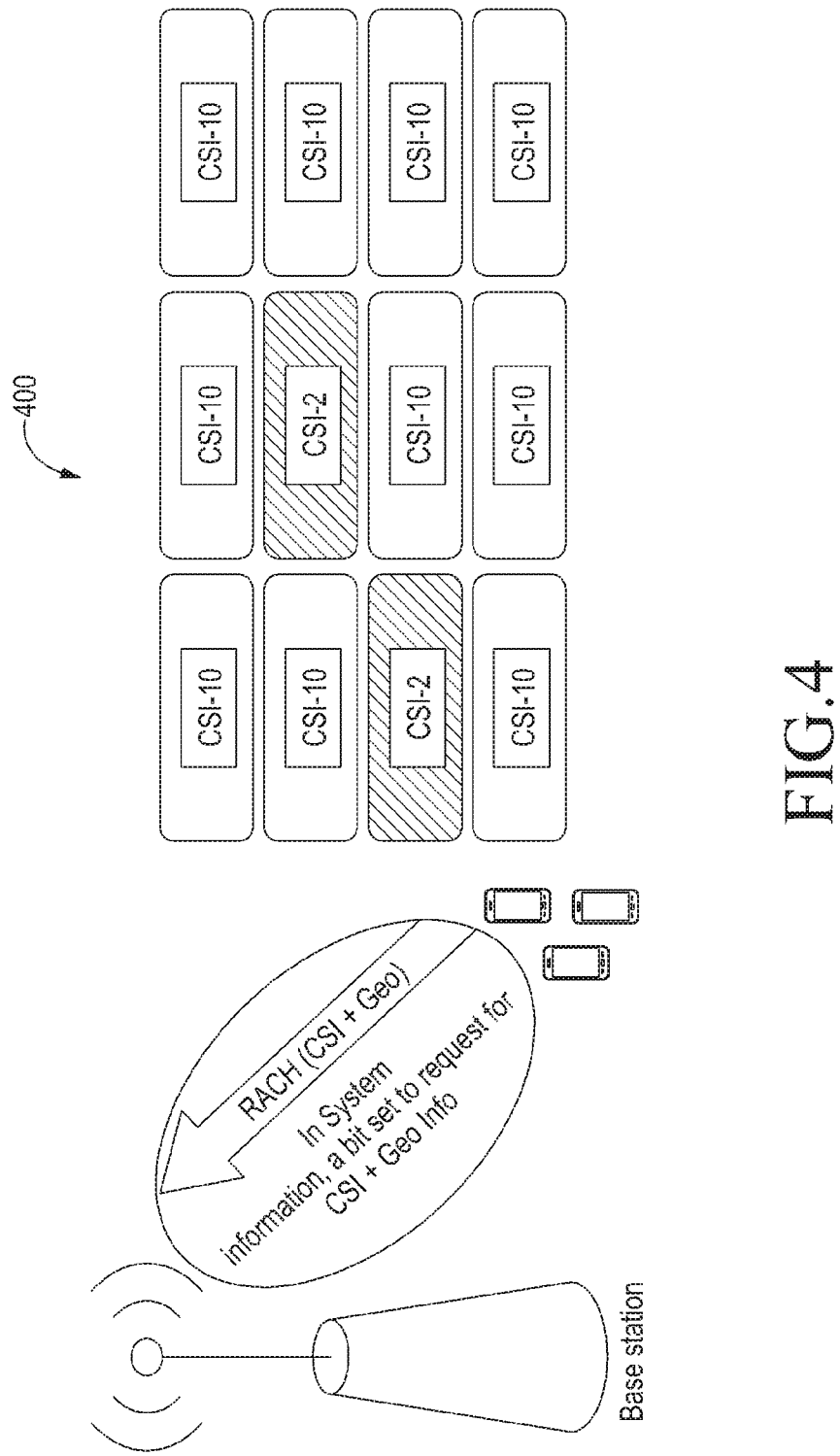
FIG. 4 is a schematic diagram illustrating creation of zones in a beam of a millimeter wave base station, according to an embodiment of the present disclosure.

FIG. 4 is a schematic diagram 400 illustrating creation of zones in a beam of a millimeter wave base station, according to an embodiment of the present disclosure. In an embodiment of the present disclosure, zones can be created based on geographical position values that include, but are not limited to, latitude and longitude values, Cartesian coordinates, signal to interference ratio for a given geographical region and the like, In an embodiment of the present disclosure, the zones can be created based on the strengths of the zones. According to the present disclosure, the base station can identify the blockage regions in the network area based on the CSI. Therefore, the base station can consider one of the geographical position values along with the CSI for creating zones in the millimeter waves.

Further, according to the present disclosure, a UE can receive an indicative bit set in broadcast system information from the base station, and can send the geographical position values along with the CSI to the base station. The base station can keep setting the indicative bit, until the base station obtains fine level CSI for a geographical area. The UE can establish a random access channel (RACH) and can share CSI and geographical position values with the base station in a part of a RACH message. Upon receiving the CSI along with geographical position values, the base station can identify the averaged CSI. Once the base station has averaged CSI for the whole geographical area, then the base station can quantize the CSI values and mark the zones.

Figure 5:
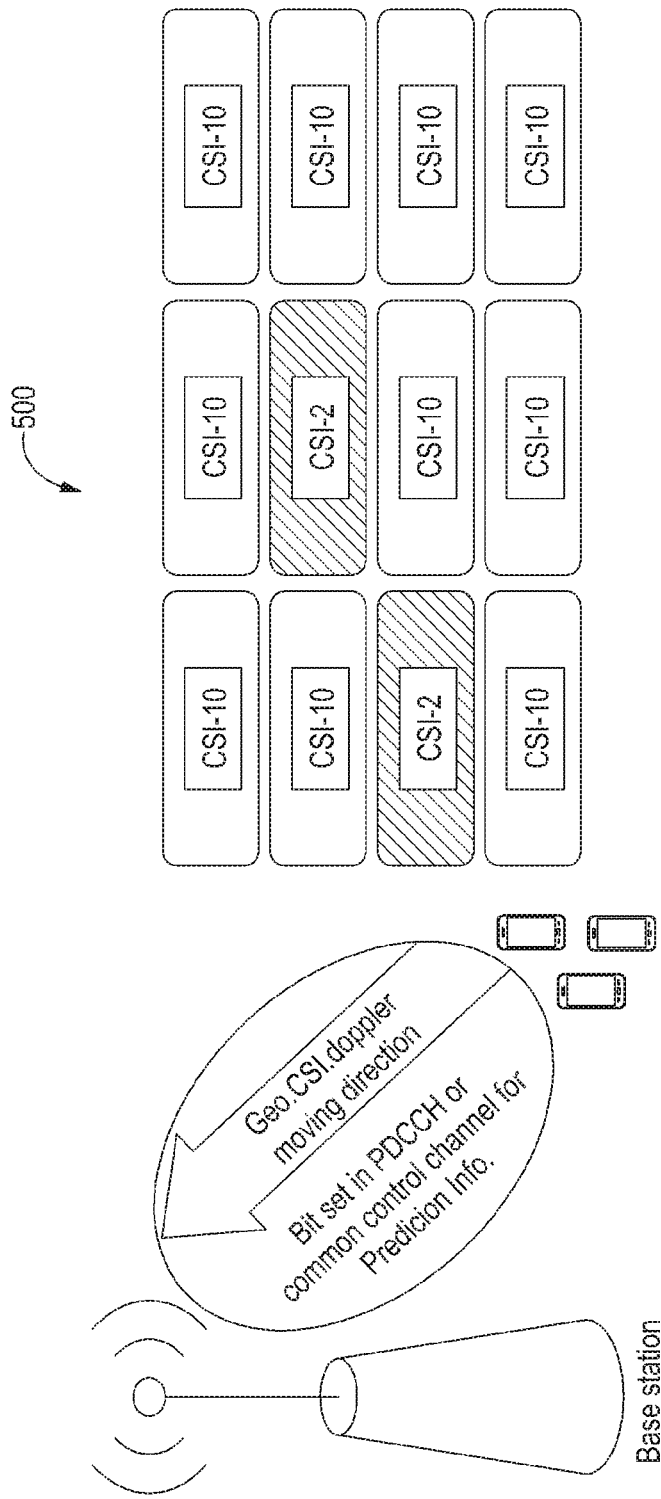
FIG. 5 is a schematic diagram illustrating tracking of mobile devices in zones of a millimeter wave system, according to an embodiment of the present disclosure.

FIG. 5 is a schematic diagram 500 illustrating tracking of mobile devices in zones of a millimeter wave system, according to an embodiment of the present disclosure.

Referring to FIG. 5, once a UE as one among mobile devices is in a connected mode with a base station, the base station can set a bit in a physical downlink control channel (PDCCH) or dedicated common control channel, as an indication for the UE to send a prediction formation. Once the UE finds the bit set in a PDCCH, the UE can send Doppler shift, moving direction and geographical position values in addition to CSI (as defined by the third generation partnership project (3GPP) for long term evolution/long term evolution advanced (LTE/LTE-A)) to the base station.

Once the base station sets the PDCCH bit for prediction information, the base station can also provide an allocation in an uplink to transmit prediction information that includes geographical position values, moving direction, a Doppler shift, and the CSI. Based on the prediction information, the base station can derive a root mean square error (RMSE) between the CSI available for the zone and the instantaneous CSI received with the feedback. If the RMSE is below a threshold RMSE, $RMSE_{thresh}$, then the base station is ready to predict the zone transition. The method of calculating RMSE and tracking the UE in the zones is described below in detail with respect to FIGS. 6 and 7.

Figure 6:
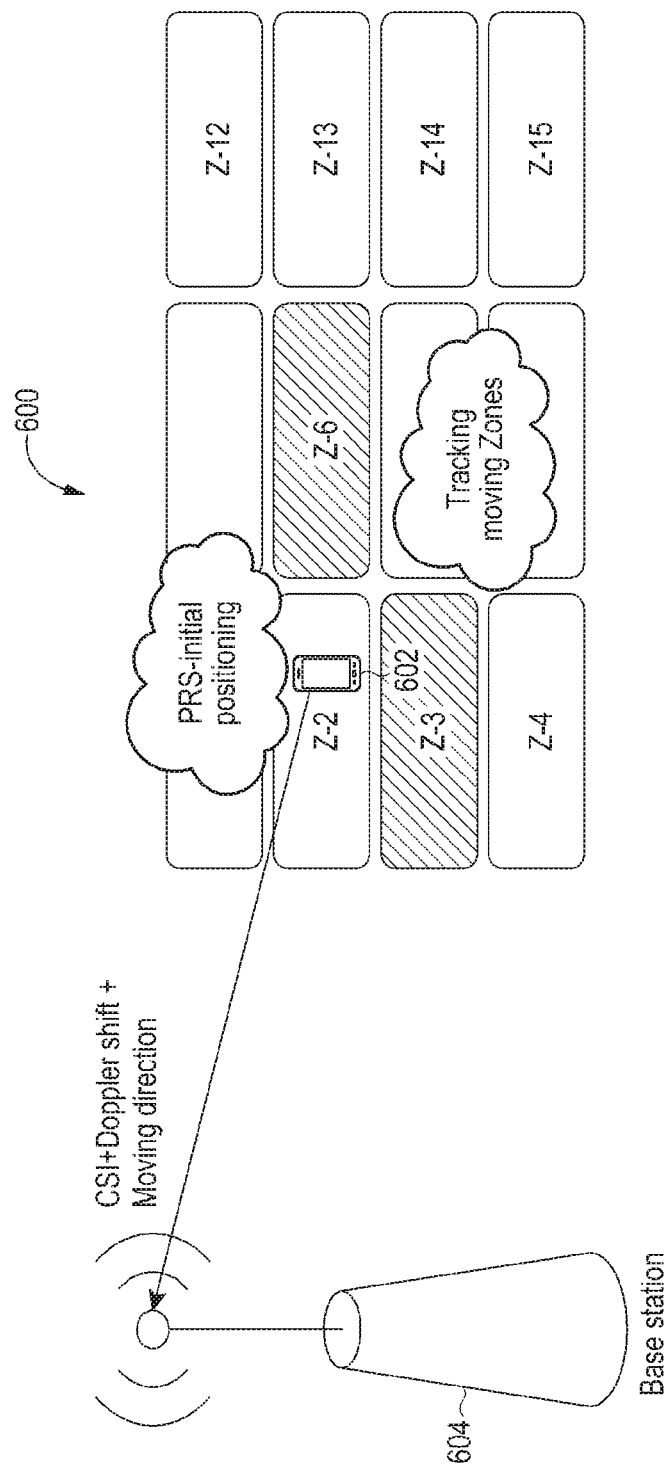
FIG. 6 is a schematic diagram illustrating zones of a bream of a millimeter wave base station and identifying movement of a UE within zones of the millimeter wave base station, according to an embodiment of the present disclosure.

FIG. 6 is a schematic diagram 600 illustrating zones of a beam of a millimeter wave base station and identifying movement of a UE within the zones of the millimeter wave base station, according to an embodiment of the present disclosure. According to the diagram 600, a single beam of the millimeter wave base station can include a plurality of zones, wherein each and every zone can be of a different quality and frequency depending on the obstructions present in the zone, and thus resources provided by the zones of the beams can vary from zone to zone.

Referring to FIG. 6, a UE 602 can be present in zone Z-2 initially and accessing a millimeter wave for communication. The UE 602 can be providing one or more of, but is not limited to, CSI, a Doppler shift and moving direction information, a positioning reference signal (PRS), and the like to the base station 604 at a regular interval of a time period. Based on the CSI and PRS, a CQI can be identified by the base station 604. Based on the location information, moving direction information, and CQI, the base station 604 identifies that the UE 602 is moving from zone Z-2 to Z-6 and can estimate the CQI of the zone. In an embodiment of the present disclosure, the base station 604 can have a zone strength equal to all of the zones present in the beam, wherein the CQI of the different zones can be collected from different UEs present in the beam and stored for future reference.

In an embodiment of the present disclosure, during an active and a connected state within the beam, the UE 602 can only transmit a Doppler shift, a moving direction and a positional reference signal (PRS) to the base station 604 so that the base station 604 can identify in which zone the UE 602 is present. In an embodiment of the present disclosure, the UE can transmit instantaneous CSI feedback to the base station along with the CSI, a Doppler shift and a moving direction. In an embodiment of the present disclosure, the UE 602 can identify the zone in which it is present based on the CQI, the CSI, the PRS, the Doppler shift and the moving direction, and directly inform the zone information to the base station 604, without departing from the scope of the information. In an embodiment of the present disclosure, the UE can use the PRS information and observed time difference of arrival (OTDOA) method, when the UE identifies the zone in which it is present. A person having ordinary skill in the art understands that the OTDOA method is described in 3GPP release 9, and therefore is not described in detail herein.

Even though, if the UE sends the zone information to the base station, the base station should have the CSI from all the arriving UE's for a certain zone. The base station should measure the CSI (CQI/PMI/RI) distribution for a given zone and then perform time/ensemble averaging across N previous sub frames, as shown in FIG. 7, wherein the channel state information can be information that includes, but is not limited to, a CQI, a pre-coding matrix indicator (PMI) elevation (rank-elevation), a PMI-azimuthal (rank-azimuthal) for 3D beam forming, a rank indicator (RI), a zone number, and the like.

Figure 7:
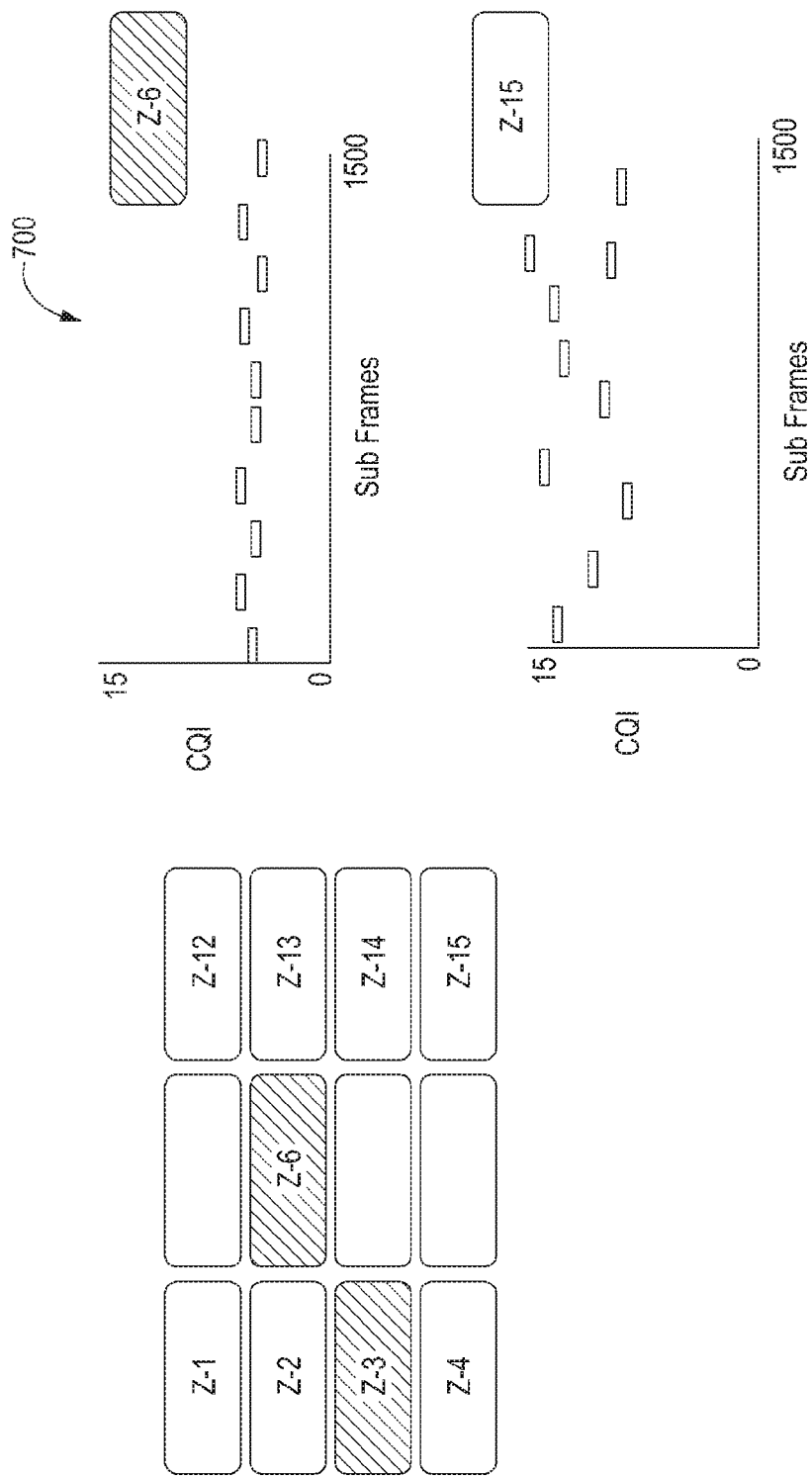
FIG. 7 is a schematic diagram illustrating time/ensemble averaging across N previous sub frames of different zones of a millimeter wave base station, according to an embodiment of the present disclosure.

FIG. 7 is a schematic diagram 700 illustrating time/ensemble averaging across N previous sub frames of different zones of the millimeter wave base station, according to an embodiment of the present disclosure.

Referring to FIG. 7, a comparison of time/ensemble averaging across N previous sub frames for zone Z-6 and Z-15 is described, wherein the time/ensemble averaging across N previous sub frames is obtained by measuring the CSI (CQI/PMI/RI) distribution at the base station. A graph is generated for zones Z-6 and Z-15 based on the CQI for the different sub-frames transmitted over a period of time in the particular zones. According to the graphs, it can be observed that in the zone Z-6, CQI for the sub frames ranging from 0 to 1500 is varying from low to moderate. In fact, it can be observed that the CQI for the sub frames is less than moderate for all the transferred sub frames. In zone Z-15 it can be observed that the CQI for the sub frames ranging from 0 to 1500 is varying from moderate to high, sometimes even reaching the maximum CQI. Thus, based on the graphs for zones Z-6 and Z-15, the base station can identify that zone Z-6 is experiencing many blockages and obstructions, and thereby leading to low CQI for the transmitted sub-frames, and zone Z-15 is experiencing a negligible number of blockages and obstructions, and thereby leading to high CQI for the transmitted sub-frames. Thus, the base station infers that zone Z-15 is better for the UE than zone Z-6.

In an embodiment of the present disclosure, a base station should calculate the error prediction for all the zones present in the millimeter wave beam of the base station. Error prediction at the base station would minimize the feedback rate, without compromising the achievable rate by the UE. In an embodiment of the present disclosure, an RMSE can be derived to minimize the prediction error for a given Doppler shift and moving direction of the UE in zones of the millimeter wave beam. The RMSE can be derived based on the formula:

$$RMSE = \sqrt{\frac{\sum_{i=1}^{n}(CSI_{obs,i} - CSI_{model,i})^2}{n}},$$

wherein $CSI_{obs,i}$ is an observed error value for the ith zone, $CSI_{model,i}$ is a model error value for the ith zone, and n is the total number of zones in the millimeter wave beam. It can be observed that the RMSE value gradually reduces over a period of time and becomes flattened, thereby making the error very negligible while the spectrum is used by the UE. In an embodiment of the present disclosure, a QR decomposition based method can also be used for error prediction, as it has superior numerical properties in finite precision.

If blockages can be characterized appropriately, then the loss due to blockages can also be modelled. An obstruction can block either a signal, an interference, or both. This can be characterized in the form of Table 1 shown below. A signal is said to be blocked if there is no line of sight (LOS) path and the SINR is below a certain threshold. A "0" in Table 1 implies a blockage and "1" implies no blockage.

TABLE 1

| Signal | Interference |
|---|---|
| 0 | 0 |
| 0 | 1 |

TABLE 1-continued

| Signal | Interference |
|---|---|
| 1 | 0 |
| 1 | 1 |

According to the present disclosure, during a blockage and obstructions caused in existing arts, resources were over used, a scheduler must minimize scheduling for a UE without disturbing the quality of service (QoS). However, upon applying the method described by the present disclosure, it is observed that SINR improves for the UE, and thereby improving the QoS provided to the UE.

Figure 8:
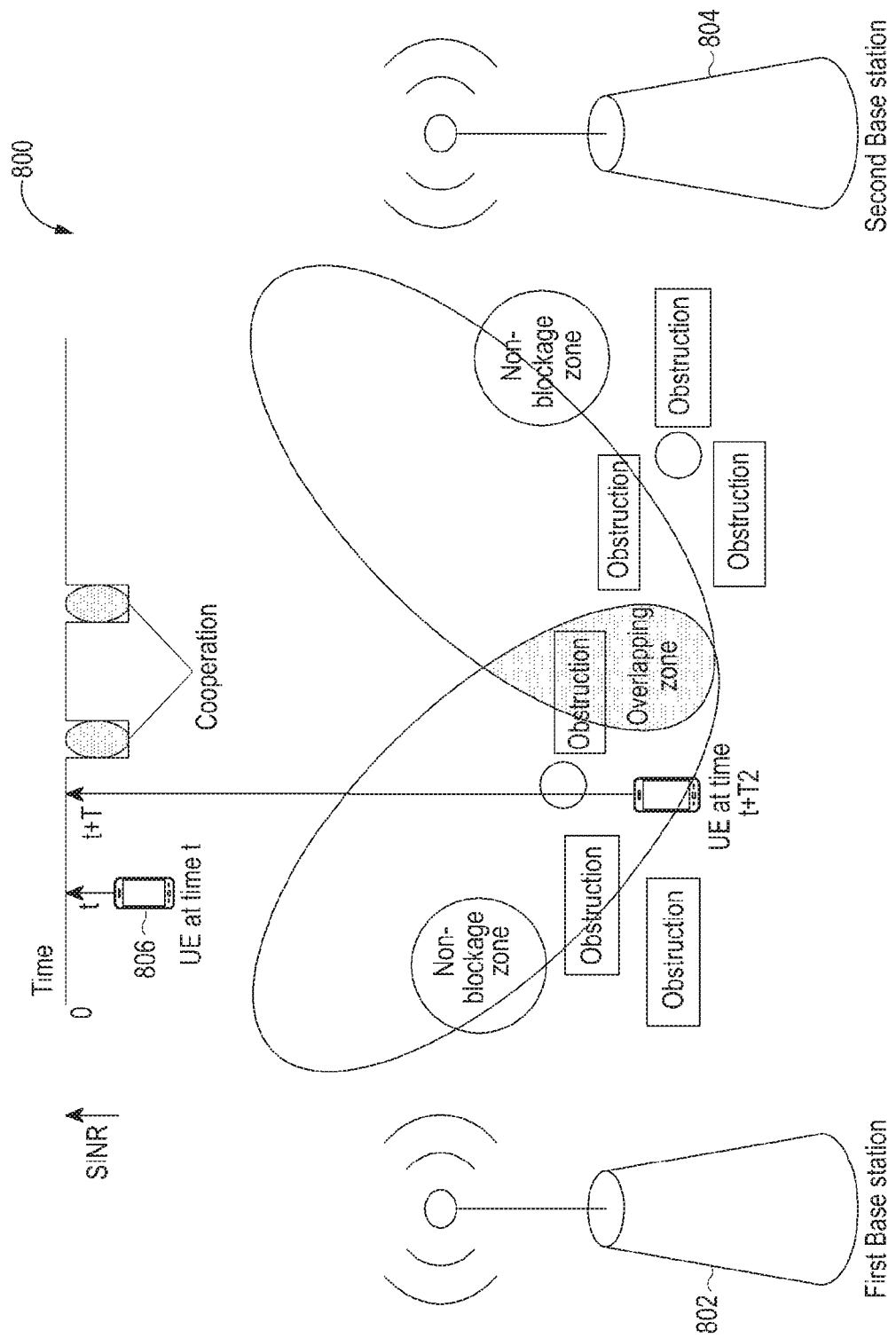
FIG. 8 is a schematic diagram illustrating a method for zone based cooperation in a millimeter wave base station, according to an embodiment of the present disclosure.

FIG. 8 is a schematic diagram of a network architecture 800 illustrating a method for zone based cooperation in millimeter wave base station, according to an embodiment of the present disclosure.

Referring to FIG. 8, the diagram of the network architecture 800 illustrates how a UE 806 moving in a network coverage area/zone of millimeter wave networks receives network resources for obstacle free services in the network area. The network architecture 800 includes a first base station 802, a second base station 804, and the UE 806, wherein the first base station 802 and the second base station 804 are each based on a millimeter wave system that generates millimeter wave beams. According to the diagram of the network architecture 800, at time 0, the UE 806 starts moving within the coverage zone of the first base station 802. The first base station 802 starts monitoring the current location, moving direction of the UE 806, and the status of the forthcoming zone in which the UE 806 might move. At time t, the first base station 802 observes that the UE 806 is present in a non-blockage zone of the first base station 802 and, thus, the UE 806 is able to access resources allocated with very low SINR. i.e., for any given zone, coarse level CSI is known at the base station As the UE 806 moves in the coverage zone, the first base station 802 identifies that, based on the current moving direction and status of the forthcoming zone, the UE 806 might encounter an obstruction at time t+T. As the UE 806 still has the resources available for accessing the network, it can be observed that data transfer remains adequate for a certain time period. The first base station 802 identifies that the UE 806 requires additional network resources to avoid being affected by an obstruction. Therefore, the first base station 802 identifies an additional amount of network resources to be provided to the UE 806 and allocates the additional amount of network resources to the UE 806 at time t+T. However, each implementation of a base station scheduler may consider any algorithm for proportioning network resources, without departing from the scope and spirit of the present disclosure.

While the UE 806 is provided with additional network resources by the first base station 802 at time t+T, even though the UE 806 faces obstacles, due to additional network resources provided, the ability of the UE 806 to access network resources is unhampered. The first base station 802 continues identifying the forthcoming blockages/obstacles in the forthcoming zones as the UE 806 continues moving in the millimeter wave base station region. In an embodiment of the present disclosure, a base station can reduce the network resources of one or more UEs in the network coverage area or zone without hampering the quality of service to them, and allocate the additional resources to a UE which is in a blockage region. The base station can allocate additional network resources to the UE without departing from the scope of the present disclosure.

Figure 9:
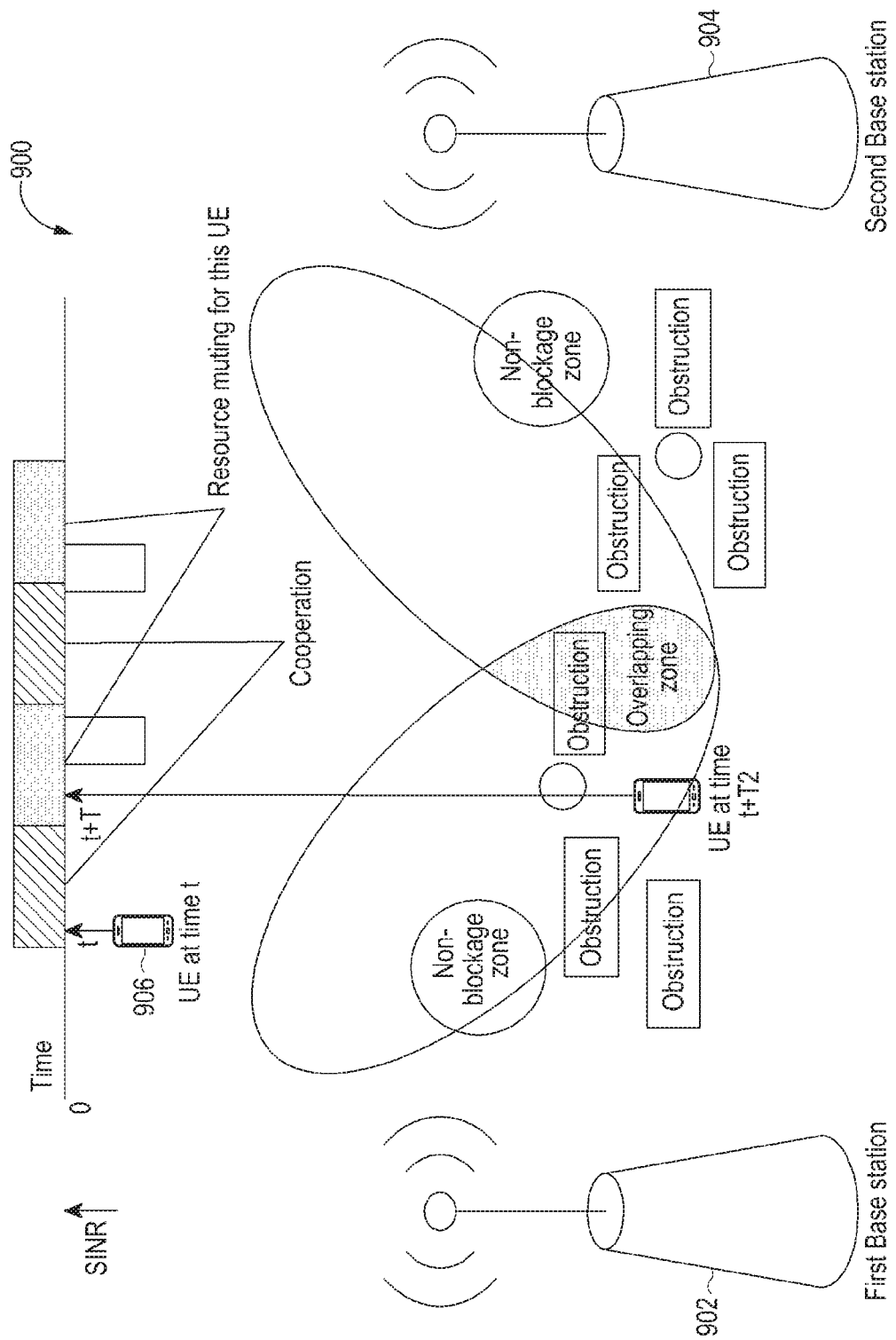
FIG. 9 is a schematic diagram illustrating a method for zone based cooperation in a millimeter wave base station, according to an embodiment of the present disclosure.

FIG. 9 is a schematic diagram of a network architecture 900 illustrating a method for zone based cooperation in a millimeter wave base station, according to an embodiment of the present disclosure.

Referring to FIG. 9, the diagram of the network architecture 900 illustrates how a UE 906 moving in a network coverage area/zone of millimeter wave networks receives network resources for obstacle free services in the network area. The network architecture 900 includes a first base station 902, a second base station 904, and the UE 906, wherein the first base station 902 and the second base station 904 are each based on a millimeter wave system that generates millimeter wave beams. According to FIG. 9, at time 0, the UE 906 starts moving within the coverage zone of the first base station 902. The first base station 902 initiates monitoring of a current location, a moving direction of the UE 906, and a status of a forthcoming zone in which the UE 906 might move. At time t, the first base station 902 observes that the UE 906 is present in a non-blockage zone of the first base station 902 and, thus, the UE 906 is able to access resources allocated with very low SINR.

As the UE 906 moves in the coverage zone, the first base station 902 identifies that, based on the current moving direction and status of the forthcoming zone, the UE 906 might encounter an obstruction at time t+T. As the UE 906 still has the resources available for accessing the network, it can be observed that data transfer remains adequate for a certain period of time. The first base station 902 identifies that the UE 906 requires additional network resources to avoid being affected by an obstruction. However, the first base station 902 fails to allocate additional network resources to the UE 906 for reasons such as, but not limited to, lack of additional network resources, an amount of network resources requested by the other UEs in the network coverage area is greater, and the like. It is understood that a person having ordinary skill in the art can understand that the base station may fail to provide additional network resources to the UE without departing from the scope and spirit of the present disclosure.

Therefore, the first base station 902 identifies that one or more other neighboring base stations can allocate the additional amount of network resources to be provided to the UE 906 as defined in the 3GPP LTE-A standard. In an embodiment of the present disclosure, a base station can periodically receive status of neighboring base stations and can select the suitable neighboring base station based on at least one of, but not limited to, a number of UEs camping on the base station, SINR of the network resources allocated to the UEs, amount of time required to access the network resources by the UE, and the like, and a person having ordinary skill in the art can understand that any other parameters can be considered for selecting a suitable neighboring base station, without departing from the scope and spirit of the present disclosure. In an embodiment of the present disclosure, any method for selecting a suitable neighboring base station can be used for selecting the base station, without departing from the scope and spirit of the present disclosure.

The first base station 902 identifies the second base station 904 as a suitable neighboring base station and communicates with the second base station 904 for jointly allocating additional network resources to the UE 906. The communication between the first base station 902 and the second base station 904 can be based on, but not limited to, a message, a signal, and the like, without departing from the scope and spirit of the present disclosure. The second base station 904 identifies the network resources required by the UE 906 and, thus, allocates the additional amount of network resources to the UE 906 at time t+T. In an embodiment of the present disclosure, the UE 906 can feedback the perceived joint channel at the UE 906 to the first base station 902, wherein the first base station 902 can communicate control channel information to the UE 906. In an embodiment of the present disclosure, the first base station 902 can provide the identified information to the second base station 904, such that the second base station 904 can allocate only the necessary additional network resources to the UE 906, without departing from the scope and spirit of the present disclosure.

As the UE 906 is provided with additional network resources by the second base station 904 at time t+T, even though the UE 906 encounters obstacles, due to additional network resources provided, the ability of the UE 906 to access network resources is unhampered. The first base station 902 continues identifying the forthcoming blockages/obstacles in the forthcoming zones as the UE 906 continues moving in the millimeter wave base station region. When the first base station 902 identifies that the UE 906 has crossed into a blockage area, the first base station 902 only provides the network resources and stops allocating network resources from the second base station 904. If the first base station 902 identifies a blockage area in the forthcoming zones, then the first base station 902 again communicates with the neighboring second base station 904 and requests an allocation of additional network resources to the UE 906.

Figure 10:
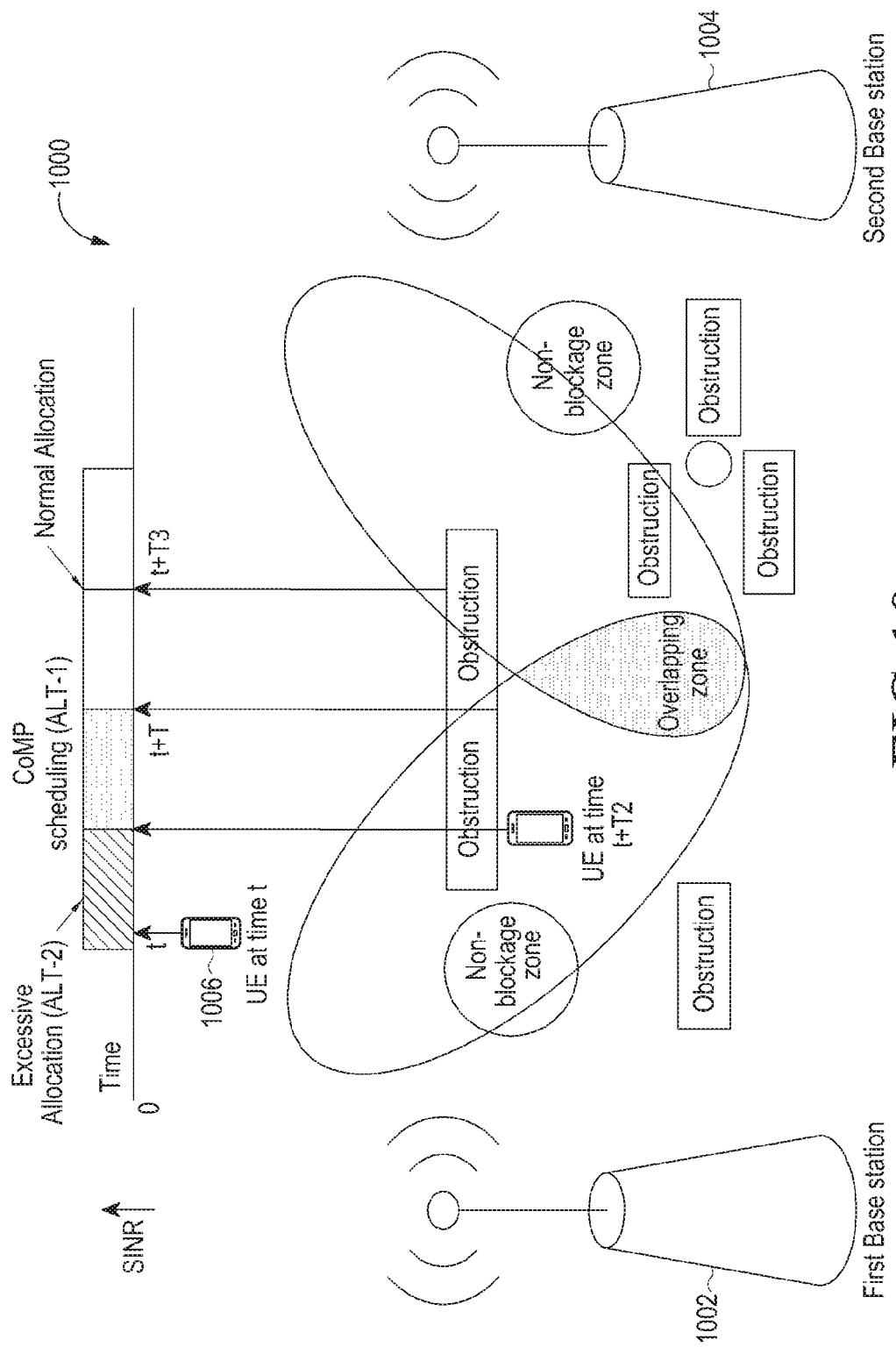
FIG. 10 is a schematic diagram illustrating a method for zone based cooperation in a millimeter wave base station, according to an embodiment of the present disclosure.

FIG. 10 is a schematic diagram of a network architecture 1000 illustrating a method for zone based cooperation in a millimeter wave base station, according to an embodiment of the present disclosure.

Referring to FIG. 10, the diagram of the network architecture 1000 illustrates how a UE 1006 moving in a network coverage area/zone of millimeter wave networks receives network resources for obstacle free service in the network area. The diagram 1000 includes a first base station 1002, a second base station 1004, and the UE 1006, wherein the first base station 1002 and the second base station 1004 are each based on a millimeter wave system that generates millimeter wave beams. According to FIG. 10, at time 0, the UE 1006 starts moving within the coverage zone of the first base station 1002. The first base station 1002 starts monitoring a current location, a moving direction of the UE 1006, and a status of the forthcoming zone in which the UE 1006 might move. At time t, the first base station 1002 observes that the UE 1006 is present in a non-blockage zone of the first base station 1002 and, thus, the UE 1006 is able to access resources allocated with very low SINR.

As the UE 1006 moves in the coverage zone, the first base station 1002 identifies that, based on the current moving direction and status of the forthcoming zone, the UE 1006 might encounter an obstruction at time t+T. Therefore, the first base station 1002 can provide sufficient network resources to the UE 1006 so that even when the UE 1006 enters a blockage region, the quality of service should not deteriorate. Thus, the UE 806 can receive a sufficient allocation of network resources from the first base station 1002. Further, after a certain time interval, at time t+T2, the first base station 1002 identifies that the UE 1006 is entering an overlapping zone and is about to face an obstruction in the overlapping zone. The first base station 1002 identifies that the present allocation of network resources to the UE 1006 cannot maintain the current quality of service. Therefore, the first base station 1002 performs CoMP scheduling and further identifies a neighboring base station, the second base station 1004, as a suitable base station for providing network resources to the UE 1006 in a blockage region (e.g. obstruction). Therefore, the second base station 1004 receives a request from the first base station 1002 and provides network resources to the UE 1006 in a blockage region, and thereby maintains the quality of the service.

Further, after a certain time period, the second base station 1004 identifies that the UE 1006 is about to avoid an obstruction and enter an unobstructed region where the typical network resources suffice for a better quality of service to the UE 1006. Once the UE 1006 avoids an obstruction, the second base station 1004 provides a sufficient allocation of network resources, and thereby maintains a better quality of service. According to the present disclosure, a base station initially attempts to provide additional network resources on its own when it identifies that a UE is about to encounter an obstruction. However, the base station will hand-over the UE to a suitable neighboring base station, only when it identifies that the network resources provided by the base station are not sufficient to maintain the current quality of service.

Figure 11:
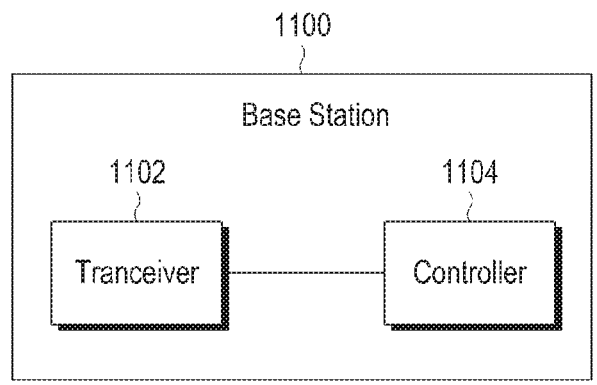
FIG. 11 is a schematic diagram of a base station according to an embodiment of the present disclosure.

FIG. 11 is a schematic diagram of a base station according to an embodiment of the present disclosure.

Referring to FIG. 11, the base station 1100 includes a transceiver 1102 configured to receive CSI from the UE, and a controller 1104 configured to: determine a plurality of zones by dividing a coverage area of a cell, identify a first zone from the plurality of zones where the UE encounters an obstructed area based on the CSI at a time, and allocate at least one resource to the UE to compensate for signal losses if the UE enters the obstructed area, wherein the controller 1104 is configured to set an indicative bit in broadcast system information, to inform the UE to send the CSI and geographical information to the at least one base station, set the indicative bit if the base station receives CSI having a level higher than an predetermined level for a geographical area, quantize CSI values based on averaged CSI for the geographical area, and mark the first zone, wherein the transceiver 1102 is configured to receive, from the UE, the CSI and the geographical information as RACH message, wherein the controller is configured to modify the identified zones, when the UE is in a connected mode, wherein for the modification of the identified zone, the controller 1104 is configured to set a bit in a PDCCH or a dedicated common control channel and an allocation in an upper line to inform the UE to send prediction information, recognize that the transceiver is configured to receive, from the UE, the prediction information comprising a Doppler shift, a moving direction, geographical information and the CSI upon the UE identifying the bit set in the PDCCH, derive, by a RMSE between the CSI available for the first zone and an instantaneous CSI received with feedback based on the transmitted prediction information, check if the RMSE is below a preset threshold, control the transceiver transmitting to the UE, information indicating that the base station is ready to predict a zone transition, if the RMSE is below the preset threshold, wherein the at least one resource allocated to the UE, a plurality of resources allocated to the UE by the base station before the UE enters the obstructed area, or a plurality of resources allocated to the UE to continue service in the obstructed area by a plurality of base stations, or a plurality of resources jointly allocated to the UE by at least one base stations if the obstructed area is predicted to be greater than the obstructed area in the identified first zone, wherein the controller 1104 is further configured to await the time if the UE is in the obstructed area; and allocate at least one resource to the UE based on a CoMP technique, wherein the CSI comprises at least one of a CQI, a PMI, a RI, and a zone number, wherein the controller is further configured to receive, from the UE, zone identification parameters, where the zone identification parameters comprise at least one of PRS and a geographical location of the UE based on OTDOA positioning, wherein the controller is further configured to receive, from the UE, information on at least one of a Doppler shift, a moving direction and instantaneous CSI, wherein the controller is further configured to: measure a CSI parameter distribution for the first zone, perform time averaging across a preset number of previous sub frames, and derive a CQI distribution over the preset number of previous sub frames to identify dips in the CSI, wherein a signal is said to be obstructed if there is no LOS path and the SINR is below a preset threshold.

Figure 12:
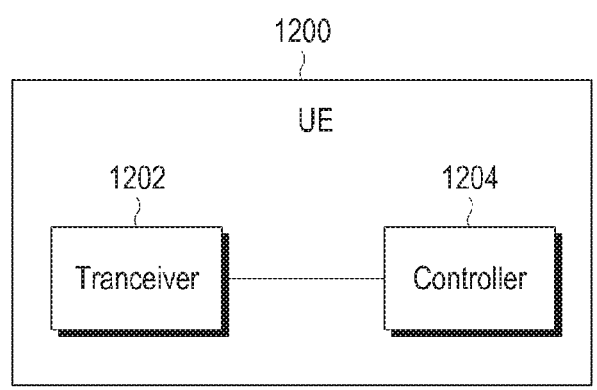
FIG. 12 is a schematic diagram of a UE according to an embodiment of the present disclosure.

Referring to FIG. 12, a UE 1200 includes a transceiver 1202 configured to transmit CSI, and receive information related to at least one resource to compensate for signal losses if the UE enters the obstructed area, where a plurality of zones by is determined by dividing a coverage area of a cell and identify a first zone from the plurality of zones where the UE encounters an obstructed area based on the CSI at a time domain, and a controller configured to control the transceiver, the transceiver 1202 is further configured to transmit the CSI and the geographical information as a RACH message in accordance with an indicative bit set in broadcast system information, where the indicative bit is set if the at least one base station receives a CSI having a level higher than a predetermined level for a geographical area, wherein the transceiver is further configured to transmit prediction information comprising a Doppler shift, a moving direction, geographical information and the CSI upon the UE identifying a bit set, by the at least one base station, in a PDCCH or a dedicated common control channel and an allocation in an upper line to inform the UE to send the prediction information, by deriving, by a RMSE between the CSI available for the first zone and an instantaneous CSI received with feedback based on the transmitted prediction information, and receive information that the at least one base station is ready to predict a zone transition, if the RMSE is below a preset threshold, wherein the at least one resource comprises a plurality of resources allocated to the UE by the base station before the UE enters the obstructed area, or a plurality of resources allocated to the UE by the base station to continue service in the obstructed area; and a plurality of resources jointly allocated to the UE by at least two of the at least one base station if the obstructed area is predicted to be greater than the obstructed area in the identified first zone, wherein the transceiver is further configured to receive an allocation of at least one resource based on a CoMP technique, where the at least one base station waits the time while the UE is in the obstructed area, wherein the CSI comprises at least one of a CQI, a PMI, a RI, and a zone number, wherein the transceiver is further configured to transmit, to the at least one base station, zone identification parameters, where the zone identification parameters comprise at least one of a PRS and a geographical location of the UE based on OTDOA positioning. wherein the transceiver is further configured to transmit, to the at least one base station, information on a Doppler shift, a moving direction and instantaneous CSI, wherein a signal is said to be obstructed if there is no LOS path and the SINR is below a preset threshold.

The present disclosure has been described with reference to certain embodiments. It will be evident that various modifications and changes may be made to these embodiments without departing from the scope and spirit of the present disclosure. Furthermore, the various devices, modules, and the like described herein may be enabled and operated using hardware circuitry, for example, complementary metal oxide semiconductor (CMOS) based logic circuitry, firmware, software and/or any combination of hardware, firmware, and/or software embodied in a non-transitory machine readable recording medium. For example, the various electrical structures and methods may be embodied using transistors, logic gates, and electrical circuits, such as an application specific integrated circuit (ASIC).

Although the present disclosure is described with reference to certain embodiments, it will be obvious for a person skilled in the art to practice the present disclosure with modifications. However, all such modifications are deemed to be within the scope of the present disclosure as defined by the appended claims and their equivalents. It is also to be understood that the appended claims and their equivalents are intended to cover all of the generic and specific features of the embodiments described herein.

What is claimed is:

1. A method for allocating a resource by a base station using a plurality of beams in a wireless communication system, the method comprising:
   determining a plurality of zones within a cell coverage of the base station, wherein the plurality of zones are zones in which an interference signal strength greater than a threshold is detected;
   receiving channel state information (CSI) from a user equipment (UE);
   identifying a first zone in which the UE has entered from the plurality of zones based on the CSI at a time domain, wherein the first zone is a zone in which a maximum interference signal strength is detected; and
   allocating a plurality of resources for the first zone to the UE,
   wherein when the UE is in a connected mode, setting a bit indicating an uplink resource for prediction information in a physical downlink control channel (PDCCH) or a dedicated common control channel, and
   wherein the uplink resource includes at least one of geographical position values, a moving direction, a doppler shift, and the CSI.

2. The method of claim 1, wherein identifying the first zone comprises:
   setting an indicative bit in broadcast system information for the UE until the base station receives a CSI having a level greater than a predetermined level for a geographical area, the broadcast system information comprising the CSI and geographical information;
   receiving, from the UE, a random access channel (RACH) message comprising the CSI and the geographical information;
   quantizing CSI values based on averaged CSI for the geographical area; and
   marking the first zone.

3. The method of claim 1, further comprising:
   receiving, from the UE, the prediction information;
   deriving a root mean square error (RMSE) between the CSI available for the first zone and an instantaneous CSI based on the received prediction information;
   checking if the RMSE is below a preset threshold or not; and transmitting, to the UE, information indicating that the base station is ready to predict a zone transition, if the RMSE is below the preset threshold.

4. The method of claim 1, wherein the plurality of resources are allocated with at least one other base station.

5. A base station for allocating a resource by the base station using a plurality of beams in a wireless communication, wherein the base station comprises:
a transceiver configured to receive channel state information (CSI) from the UE; and
a controller configured to:
  determine a plurality of zones within a cell coverage of the base station, wherein the plurality of zones are zones in which an interference signal strength greater than a threshold is detected,
  identify a first zone in which the UE has entered from the plurality of zones based on the CSI at a time domain, wherein the first zone is a zone in which a maximum interference signal strength is detected,
  allocate a plurality of resources for the first zone to the UE, and
  set a bit indicating an uplink resource for prediction information in a physical downlink control channel (PDCCH) or a dedicated common control channel when the UE is in a connected mode,
wherein the uplink resource includes at least one of geographical position values, a moving direction, a doppler shift, and the CSI.

6. The base station of claim 5, wherein the controller is configured to:
  set an indicative bit in broadcast system information for the UE to inform the UE until the base station receives a CSI having a level greater than a predetermined level for a geographical area, the broadcast system information comprising the CSI and geographical information;
  quantize CSI values based on averaged CSI for the geographical area, if the transceiver is configured to receive a random access channel (RACH) message comprising the CSI and the geographical information, and
  mark the first zone.

7. The base station of claim 5, wherein:
when the transceiver is configured to receive, from the UE, the prediction information, the controller is configured to derive, by a root mean square error (RMSE) between the CSI available for the first zone and an instantaneous CSI based on the received prediction information,
check if the RMSE is below a preset threshold, and
control the transceiver to transmit to the UE, information indicating that the base station is ready to predict a zone transition, if the RMSE is below the preset threshold.

8. The base station of claim 5,
a plurality of resources are allocated with at least one other base station.

9. A method for receiving resource allocation information by a user equipment (UE) in a wireless communication system comprising a base station using a plurality of beams, the method comprising:
transmitting channel state information (CSI) to the base station; and
receiving, from the base station, the resource allocation information indicating a plurality of resources for a first zone to the UE when the UE enters the first zone among a plurality of zones within a cell coverage of the base station,
wherein the plurality of zones are zones in which an interference signal strength greater than a threshold is detected, and the first zone is a zone in which a maximum interference signal strength is detected,
wherein when the UE is in a connected mode, receiving a bit indicating an uplink resource for prediction information in a physical downlink control channel (PDCCH) or a dedicated common control channel, and
wherein the uplink resource includes at least one of geographical position values, a moving direction, a doppler shift, and the CSI.

10. The method of claim 9, further comprising:
identifying an indicative bit set in broadcast system information, wherein the received CSI by the base station has a level greater than a predetermined level for a graphical area; and
transmitting to the base station a random access channel (RACH) message comprising the CSI and geographical information,
wherein the RACH message is used to quantize CSI values based on averaged CSI for a geographical area and to mark the first zone.

11. The method of claim 9, further comprising:
transmitting, to the base station, the prediction information; and
receiving, from the base station, information indicating that the base station is ready to predict a zone transition, if a root mean square error (RMSE) between the CSI available for the first zone and an instantaneous CSI derived based on the prediction information, is below a preset threshold.

12. The method of claim 9, wherein
the plurality of resources are allocated with at least one other base station.

13. A user equipment (UE) for allocating a resource by a base station using a plurality of beams in a wireless communication system, the UE comprising:
a transceiver configured to transmit channel state information (CSI) to the base station, and receive, from the base station, the resource allocation information indicating a plurality of resources for a first zone to the UE when the UE enters the first zone among a plurality of zones within a cell coverage of the base station,
wherein the plurality of zones are zones in which an interference signal strength greater than a threshold is detected, and the first zone is a zone in which a maximum interference signal strength is detected,
wherein when the UE is in a connected mode, the transceiver is further configured to receive a bit indicating an uplink resource for prediction information in a physical downlink control channel (PDCCH) or a dedicated common control channel, and
wherein the uplink resource includes at least one of geographical position values, a moving direction, a doppler shift, and the CSI.

14. The UE of claim 13, wherein the controller is configured to identify an indicative bit set in broadcast system information, wherein the received CSI by the base station has a level greater than a predetermined level for a geographical area, and control the transceiver configured to transmit to the base station a random access channel (RACH) message comprising the CSI and geographical information,
wherein the RACH message is used to quantize CSI values based on averaged CSI for a geographical area and to mark the first zone.

15. The UE of claim 13, wherein, the transceiver is further configured to:
  transmit, to the base station, the prediction information, and receive information indicating that the base station is ready to predict a zone transition, if a root mean square error (RMSE) between the CSI available for the first zone and an instantaneous CSI derived based on the predication information is below a preset threshold.

16. The UE of claim 13, wherein the plurality of resources are allocated with at least one other base station.

* * * * *